C. H. DESAUTELS.
OVERHEAD SWITCH.
APPLICATION FILED JAN. 28, 1920.

1,337,121.

Patented Apr. 13, 1920.
3 SHEETS—SHEET 1.

INVENTOR
Charles H. Desautels.
BY
Franklin G. Neal.
ATTORNEY

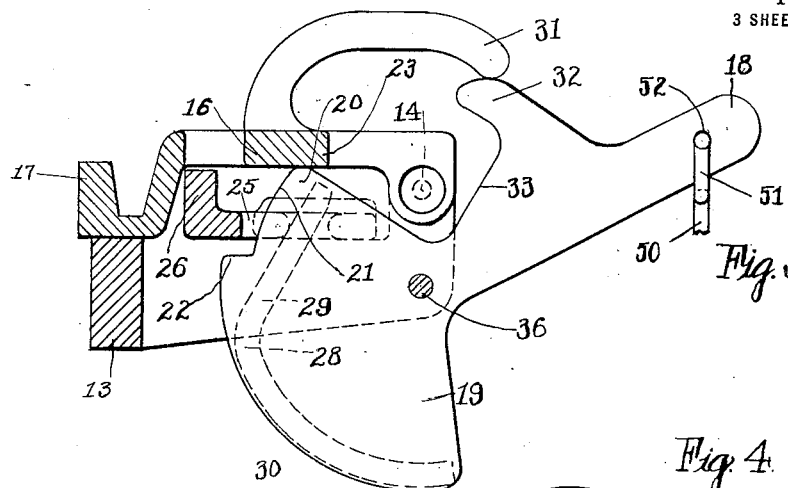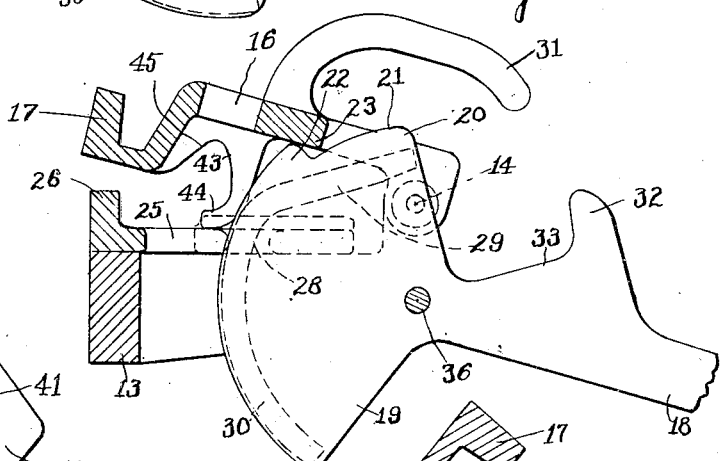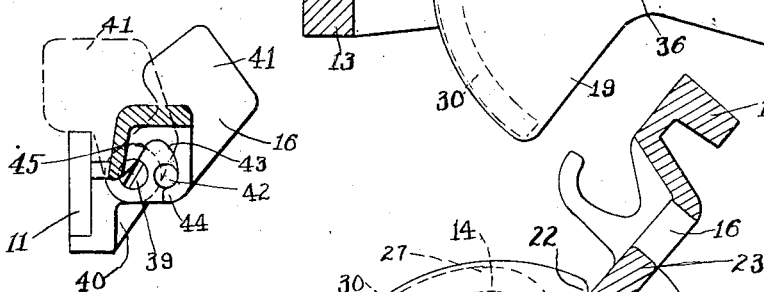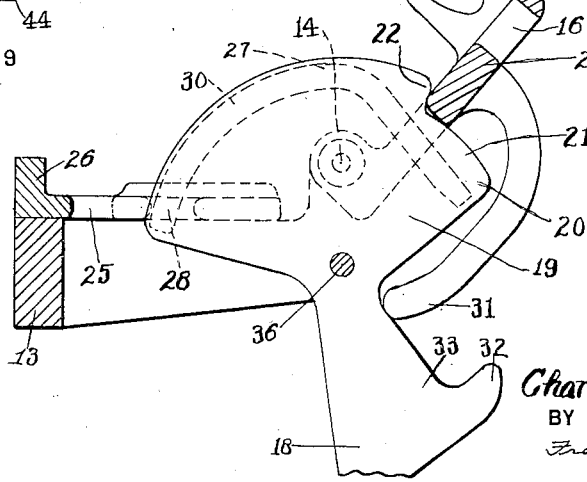

C. H. DESAUTELS.
OVERHEAD SWITCH.
APPLICATION FILED JAN. 28, 1920.

1,337,121.

Patented Apr. 13, 1920.
3 SHEETS—SHEET 3.

INVENTOR
Charles H. Desautels.
BY
Franklin G. Neal
ATTORNEY

UNITED STATES PATENT OFFICE.

CHARLES H. DESAUTELS, OF SPRINGFIELD, MASSACHUSETTS.

OVERHEAD SWITCH.

1,337,121.   Specification of Letters Patent.   Patented Apr. 13, 1920.

Application filed January 28, 1920. Serial No. 354,603.

*To all whom it may concern:*

Be it known that I, CHARLES H. DESAUTELS, residing at Springfield, county of Hampden, State of Massachusetts, have invented certain new and useful Improvements in Overhead Switches, of which I declare the following to be a full, clear, and exact description.

My present invention relates to switches for monorail overhead tracks such as are used in various systems of transportation, and has for its object a readily operable switch which will positively prevent a carriage or hook on said track dropping off during the shifting of the switch. Various further objects relating to constructional and operating advantages will appear from the ensuing description and the appended claims.

My improved switch will now be described with particular reference to the accompanying drawings, in which—

Fig. 3 is a section on line 3—3 of Fig. 1 showing the switch in its closed or main line position;

Fig. 4 is a similar view showing the switch partially shifted to the open or branch line position, the branch switch being moved into position;

Fig. 5 is a similar view showing the switch completely shifted to the open or branch line position;

Fig. 8 is a detail taken on line 8—8 of Fig. 1, showing a safety attachment to insure positive closing of the main line when the switch is shifted to the branch track.

Figure 1:
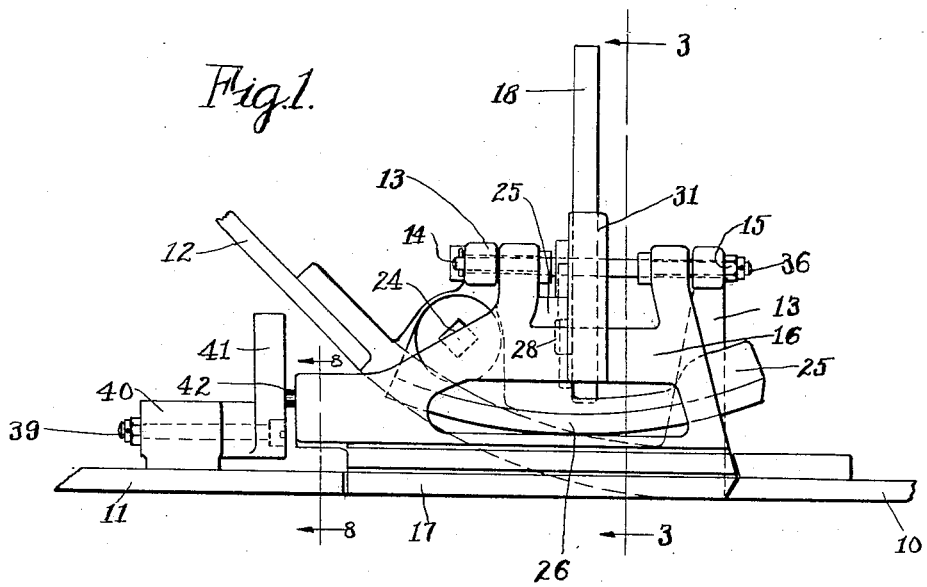
Figure 1 is a top plan view of the switch together with portions of the adjacent track.
Figure 2:
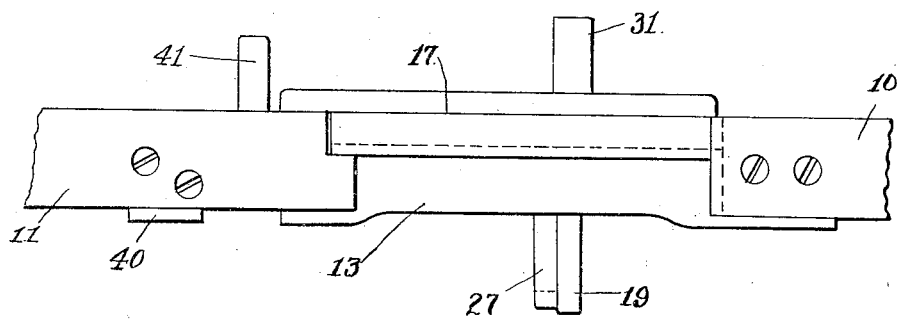
Fig. 2 is a front elevation thereof.

The switch is designed to connect a main line track 10 with either a continuation 11 thereof or a branch track 12. These tracks may be supported in any suitable or desired manner as upon hangers of the usual type, which it is not necessary to show or describe. The carriers which are adapted for use upon these tracks are usually in the form of hooks having a roller mounted to travel upon the tracks. These carriers frequently carry a very heavy load, and serious accidents have resulted through the wheels of the carrier running off the open end of the track and permitting the carrier and its load to drop off. By the switch mechanism about to be described I prevent by positive means the opening of the track to such an extent that one of the carrier rolls can slip off.

The switch is mounted on a bracket 13 connected to and preferably supported by the main line tracks 10 and 11. Pivotally mounted for rotation about a horizontal axis in bearings 14 and 15 on the bracket 13 is a main line switch 16 having a track portion 17 adapted to register with the main line tracks 10 and 11 when the switch is in the main line position. This main line switch is operated by a handle 18 having a cam 19 thereon presenting a switch-engaging portion 20, a circular portion 21, and a second switch engaging portion 22. These three portions of cam 19 act against a cross bar 23 on the main line switch, and function as will be described later.

Pivoted at 24 to the bracket 13 for rotation about a vertical axis is a branch line switch 25 having a track portion 26 adapted to register with the main line track 10 and branch track 13 when the switch has been moved to the branch line position. The branch switch is operated by the following mechanism. Cam 19 has a rib cam 27 on one side thereof, which engages a slot 28 formed in the switch 25, and has an operating portion 29 and a locking portion 30. This cam is designed to give the branch switch a relatively rapid motion into place and to hold it in that position while the main line switch is being carried to inoperative position.

In order to insure that the branch switch cannot be opened until the main line switch has been lowered to a position in which it will block the path of a wheel on either track 10 or 12, the following device is provided. Upon the main switch 16 is a horn 31 adapted to engage with a lug 32 and a flat portion 33 of handle 18. The end of horn 31 is preferably rounded, and for a short distance concentric with pivot 14 as at 34; and lug 31 is preferably concentric as at 35 with the pivot 36 of the handle 18. It may be noted here that pivot 36 is located lower than pivots 14 and 15, so that an eccentric motion is secured between handle 18 and the main switch. The purpose of this construction will appear fully below.

Figure 7:
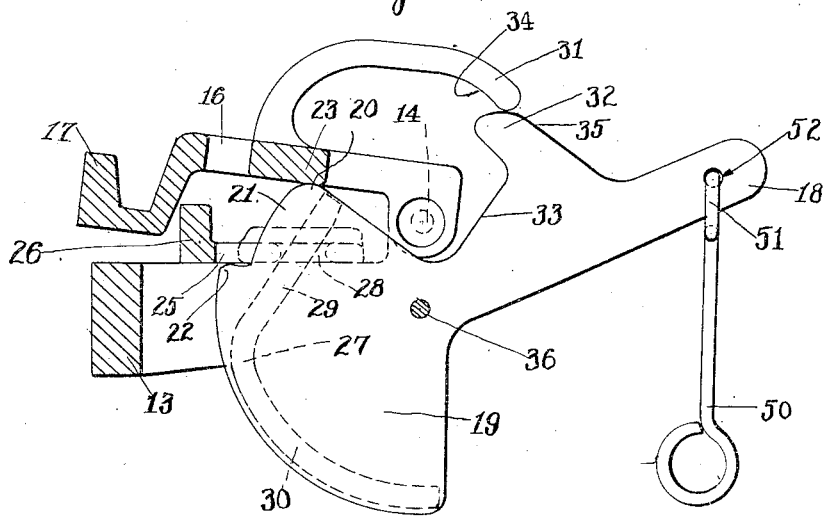
Fig. 7 is a similar view showing a later stage in the shifting from the branch to the main line position, and illustrating also the shifting from the main to the branch line position at an earlier stage than Fig. 4.

The operation of the parts thus far enumerated will now be described. Starting with the parts in the position of Fig. 3, that is to say, with the switch in its main line position, handle 18 is depressed. This causes engagement of portion 20 of cam 19 with the cross bar 23, raising the latter until the eccentric movement of the main switch and the handle above referred to causes portion 20 to pass by the edge of the cross bar. Fig. 7 shows a stage in the operation just before this happens. During this motion rib cam 29 will move the branch switch forwardly; the parts being so designed that as soon as the main switch rises clear of the branch switch cross bar 23 will ride upon the circular part 21 of the cam 19, this preserving the main switch at a constant elevation in a position to block the path of a carrier on either track 10 or 12.

Fig. 4 shows the parts in the position they occupy just after the branch switch has been completely brought into position. In this figure it will be noted that portion 22 of cam 19 is just engaging the cross bar. This engagement serves to carry the main switch from the position of Fig. 4 to that of Fig. 5 on further motion of the handle. In the position of Fig. 5 the main switch is entirely out of the path of carriers on any of the tracks, and the switch is set in the branch line position.

Figure 6:
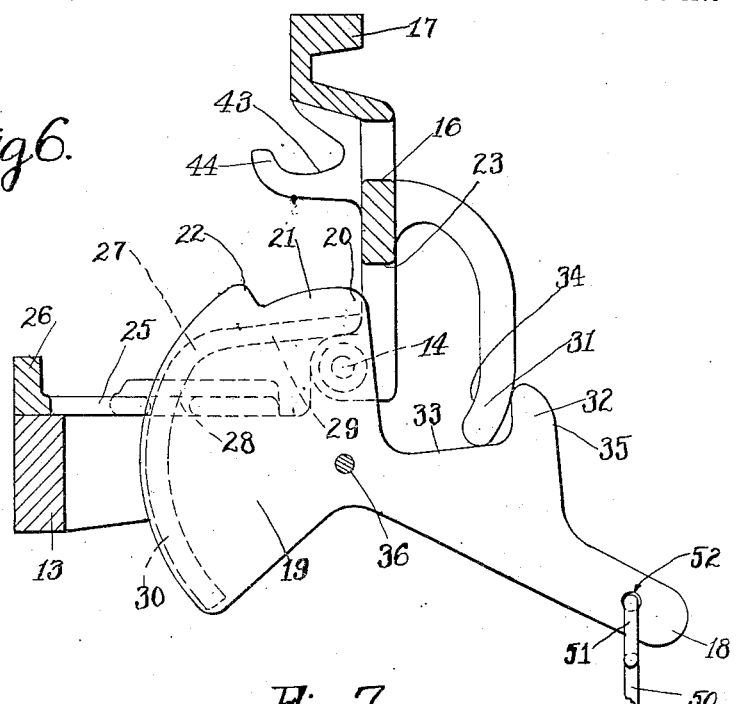
Fig. 6 is a similar view showing the switch partially shifted from the branch to the main line position.

The converse operation, that of shifting the switch from the branch to the main line position, is as follows. With the parts in the position of Fig. 5 horn 31 is in engagement with the flat portion 33 of the handle. As the handle is raised the main switch will be lifted to the position of Fig. 6. On further motion of the handle the main switch passes its vertical center and will drop until cross bar 23 is caught by the switch-engaging portion 22 of cam 19. The parts are now in substantially the position of Fig. 4. As the handle is still further swung the branch switch will be withdrawn from the position of Fig. 4 to that of Fig. 7, and finally the main switch will be lowered into position.

It should be particularly noted that in the above sequence of operations there is no opportunity for a carrier to run off the open end of either track 10 or 12. During the movement of the switch from the main to the branch position the main switch is held in the position of Fig. 4 until the branch switch is completely moved into place. There is then no open end of either track 10 or 12 to guard against, and the main switch can be shifted in safety. In the movement of the switch in the opposite direction there are two ways in which it is necessary to guard against a wheel running off an open-ended track. First, a carrier wheel may be either on the branch switch or immediately adjacent at the time the handle is raised. Second, a carrier wheel may roll along the track after the operation has been partially completed. The first difficulty is guarded against as follows. Suppose a carrier wheel to be anywhere on the branch switch or so close to it that it would be hit by the descent of the main switch. Then as the main switch drops from the position of Fig. 6 it will fall upon the carrier wheel and will be held in a position intermediate those of Figs. 6 and 7. From a comparison of these figures it will be seen that if the main switch be held in any intermediate position horn 31 will interfere with lug 35. This will prevent further motion of the handle and consequently the branch switch cannot be moved until the carrier wheel is moved to one side. The second difficulty is guarded against by holding the main line switch in the position of Fig. 4 until the branch switch has been shifted, thus blocking both of tracks 10 and 12.

The manner in which track 11 is protected will now be described. Pivoted at 39 to a bracket 40 on track 11 is a stop 41 having a pin 42 projecting from one side thereof which operates in a cam slot 43 on one side of the main switch 16. When the main switch is closed the parts are in the full-line position of Fig. 8. As the main switch is raised the tail 44 of the cam will raise the stop to the dotted line position. If a carrier wheel is in the path of the stop the switch cannot be moved, thus preventing the main switch being raised with a carrier wheel adjacent the open end of track 11. After the stop has been moved into position it will prevent carriers on track 11 running off the open end thereof. When the main switch is lowered portion 45 of the cam will strike the pin and will shift the stop to the inoperative or dotted line position. This does not occur, however, until the main switch has been lowered to a position in which it will fully protect track 11, and therefore there is no possibility of a carrier wheel coming off the open end of this track.

In order to operate handle 18 conveniently a handle 50 is provided. Preferably this handle is so constructed that it cannot be thrown upwardly so that it will lie over the top of the switch in an inaccessible position. This may be accomplished by connecting the handle 50 to handle 18 by a ring 51 passing through a hole 52; the hole being so positioned that the ring cannot pass around the end of the handle. The ring is sufficiently large so that it will permit handle 50 to stand vertically at all times. This result may, however, be accomplished in any other suitable manner.

It will be seen from the above description that all tracks are thoroughly protected at all times in the operation of the switch. Former switches have protected the tracks during a portion of the operation, but I believe I am the first to provide a switch which is protected at all periods, and I wish to claim this result as broadly as may be. Various changes in the construction and method of operation of the switch may be made without departing from the invention as set forth in the appended claims.

What I claim as new and desire to secure by Letters Patent is:

1. A switch adapted to connect a main line track with either a continuation thereof or a branch track, comprising a main switch, a branch switch, and operating means therefor constructed and arranged to cause the main switch to block the track during the entire movement of the branch switch into operative position.

2. A switch adapted to connect a main line track with either a continuation thereof or a branch track, comprising a main switch, a branch switch, and operating means therefor constructed and arranged to cause the main switch to block the track during the entire movement of the branch switch into operative position, and means to block the continuation of the main track when the main switch is moved out of operative position.

3. A switch adapted to connect a main line track with either a continuation thereof or a branch track, comprising a main switch, a branch switch, and operating means therefor constructed and arranged to cause the main switch to block the track during the entire movement of the branch switch into operative position, and positively operated means to block the continuation of the main track when the main switch is moved out of operative position.

4. A switch adapted to connect a main line track with either a continuation thereof or a branch track, comprising a main switch, a branch switch, and operating means therefor constructed and arranged to cause the main switch to block the track during the entire movement of the branch switch into operative position, and means positively operated by the main switch to block the continuation of the main track when the main switch is moved out of operative position.

5. A switch adapted to connect a main line track with either a continuation thereof or a branch track, comprising a main switch, a branch switch, and operating means therefor comprising a pivoted handle having cam means thereon constructed and arranged to operate both the main and the branch switch.

6. A switch adapted to connect a main line track with either a continuation thereof or a branch track, comprising a main switch, a branch switch, and operating means therefor comprising a pivoted handle having cam means thereon constructed and arranged to operate both the main and the branch switches, and interlocking means between the main switch and the handle constructed and arranged to prevent operation of the switch when a carrier is on or adjacent the branch switch.

7. A switch adapted to connect a main line track with either a continuation thereof or a branch track, comprising a main switch rotatable about a horizontal axis, a branch switch rotatable about a vertical axis, and means for rotating the switches about their respective axes, said means operating to maintain the main switch in track-blocking position during the rotation of the branch switch.

8. A switch adapted to connect a main line track with either a continuation thereof or a branch track, comprising a main switch rotatable about a horizontal axis, a branch switch rotatable about a vertical axis, and means for rotating the switches about their respective axes, said means operating to maintain the main switch in track-blocking position during the rotation of the branch switch, and means for preventing the withdrawal of the branch switch from operative position until the main switch is in track-blocking position.

9. A switch adapted to connect a main line track with either a continuation thereof or a branch track, characterized by the provision of positively operated means to close the end of each track during all times when the switch is not connected in operative position therewith.

10. A switch adapted to connect a main line track with either a continuation thereof or a branch track, comprising a main switch rotatable about a horizontal axis, a branch switch shiftable laterally to and from operative position, and means separate from either the main or the branch switch for operating both of them.

11. A switch adapted to connect a main line track with either a continuation thereof or a branch track, comprising a main switch rotatable about a horizontal axis, a branch switch shiftable laterally to and from operative position, a handle pivoted on an axis parallel with the axis of the main switch, operating connections between the handle and the main switch and the handle functioning through the eccentric rotation of the main switch and the handle to prevent motion of the handle to remove the branch switch from operative position except when the main switch is in track-blocking position.

12. A switch adapted to connect a main line track with either a continuation thereof or a branch track, comprising a main switch rotatable about a horizontal axis, a branch switch shiftable laterally to and from operative position, and operating means for both switches constructed and arranged to raise the main switch from operative position to track-blocking position, to shift the branch switch into operative position, and then to raise the main switch from track-blocking to inoperative position.

13. A switch adapted to connect a main line track with either a continuation thereof or a branch track, comprising a main switch rotatable about a horizontal axis, a branch switch shiftable laterally to and from operative position, a handle, an operating connection between the branch switch and the handle, and an operating connection between the main switch and the handle constructed and arranged to maintain the main switch stationary during substantially the entire period of operation of the branch switch.

14. A switch adapted to connect a main line track with either a continuation thereof or a branch track, comprising a main switch rotatable about a horizontal axis, a branch switch shiftable laterally to and from operative position, a handle, an operating connection between the branch switch and the handle, and abutments on the main switch and the handle adapted to cause positive motion of the main switch in either direction and to permit of free play of the main switch between the abutments on the handle.

CHARLES H. DESAUTELS.